United States Patent [19]

Armini et al.

[11] 4,421,589

[45] Dec. 20, 1983

[54] LAMINATOR FOR ENCAPSULATING MULTILAYER LAMINATE ASSEMBLY

[75] Inventors: Anthony J. Armini, Bedford; Michael J. Nowlan, Woburn, both of Mass.

[73] Assignee: Spire Corporation, Bedford, Mass.

[21] Appl. No.: 397,824

[22] Filed: Jul. 13, 1982

[51] Int. Cl.³ .................... B29C 17/00; C12H 1/00
[52] U.S. Cl. .................... 156/382; 156/381; 156/378; 156/359; 156/358; 156/498; 156/583.3; 156/583.8; 156/583.9; 156/583.1; 100/93 P; 100/38
[58] Field of Search ............... 156/282, 285, 382, 381, 156/378, 366, 359, 358, 351, 350, 498, 583.9, 583.8, 583.3, 583.1; 100/38, 43, 93 P

[56] References Cited

U.S. PATENT DOCUMENTS

| | | | |
|---|---|---|---|
| 3,738,890 | 6/1973 | Johnson et al. | 156/382 |
| 3,818,823 | 6/1974 | Bond | 156/285 |
| 3,964,958 | 6/1976 | Johnston | 156/498 |
| 4,078,962 | 3/1978 | Krueger | 100/93 P |
| 4,083,205 | 4/1978 | Clarke et al. | 156/583.9 |
| 4,287,015 | 9/1981 | Danner, Jr. | 156/285 |
| 4,365,547 | 12/1982 | McClure, Jr. | 156/359 |

FOREIGN PATENT DOCUMENTS 520185  5/1957  Italy ..................... 156/382

Primary Examiner—Edward C. Kimlin
Assistant Examiner—Merrell C. Cashion
Attorney, Agent, or Firm—Morse, Altman & Dacey

[57] ABSTRACT

A laminator for laminating and/or encapsulating a multilayer laminate assembly is disclosed. The laminator includes a processing chamber designed to receive the laminate assembly. The processing chamber is provided with independently controllable temperature, vacuum and pneumatic pressure capabilities for effecting optimum processing conditions for particular materials and configurations. The laminator features a double-vacuum system and a choice between two automatic cycles: a lamination cycle and a lamination-and-cure cycle. Preferably, the laminator is microprocessor controlled and is provided with a control panel where the processing parameters are set and monitored.

10 Claims, 7 Drawing Figures

LAMINATOR FOR ENCAPSULATING MULTILAYER LAMINATE ASSEMBLY

BACKGROUND OF THE INVENTION

1. Field of the Invention

The present invention relates generally to laminators and, more particularly, to a laminator for laminating and/or encapsulating multilayer laminate assemblies.

2. The Prior Art

The most critical part in the encapsulation cycle of a multilayer laminate assembly is the part preceding the cure cycle. This is so because the amount of time the laminate assembly is maintained under vacuum, the rate of temperature rise, the quantity of pneumatic pressure and the time during the cycle when the pressure is applied to the laminate assembly all affect the quality of the lamination. By quality, it is meant to achieve encapsulated composite structures that are, for the most part, void-free. This is particularly important when encapsulating photovoltaic modules. Optimum processing conditions vary depending on the particular materials making up the laminate assembly and their configurations. The selection of these respective optimum processing conditions requires that the laminator's processing chamber be provided with independently variable and controllable temperature, vacuum and pneumatic pressure capabilities. Presently available laminators just do not measure up to today's exacting processing requirements. Further and as far as known, present day laminators only effect laminating, with the curing of the laminate having to be effected thereafter some place else, such as for example, in an oven.

SUMMARY OF THE INVENTION

It is a principal object of the present invention to overcome the above disadvantages by providing a laminator designed both for laminating and/or encapsulating a multilayer laminate assembly.

More specifically, it is an object of the present invention to provide a laminator for laminating and/or encapsulating multilayer laminate assemblies comprising a processing chamber provided with a double-vacuum system having two compartments and with independently controllable temperature, vacuum and pneumatic pressure capabilities for each compartment of the double-vacuum system, a microprocessor for controlling the operation of the laminator, preferably in two separate automatic cycles, and a readily accessible, visible control panel where the desired respective processing parameters easily are introduced and monitored. The term "encapsulation" as used in the specification and in the appended claims is intended to include both the lamination and the curing of the multilayer laminate assembly. Preferably, each compartment of the double-vacuum system of the processing chamber is provided with separately controllable temperature and vacuum controllers. Preferably, the vacuum controllers include two types of indicators for different pressure levels. Preferably, the processing chamber opens automatically at the end of the selected processing cycle. Preferably, a forced cooling system, which is purgable, surrounds the processing chamber.

Other objects of the present invention will in part be obvious and will in part appear hereinafter.

The invention accordingly comprises the laminator of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
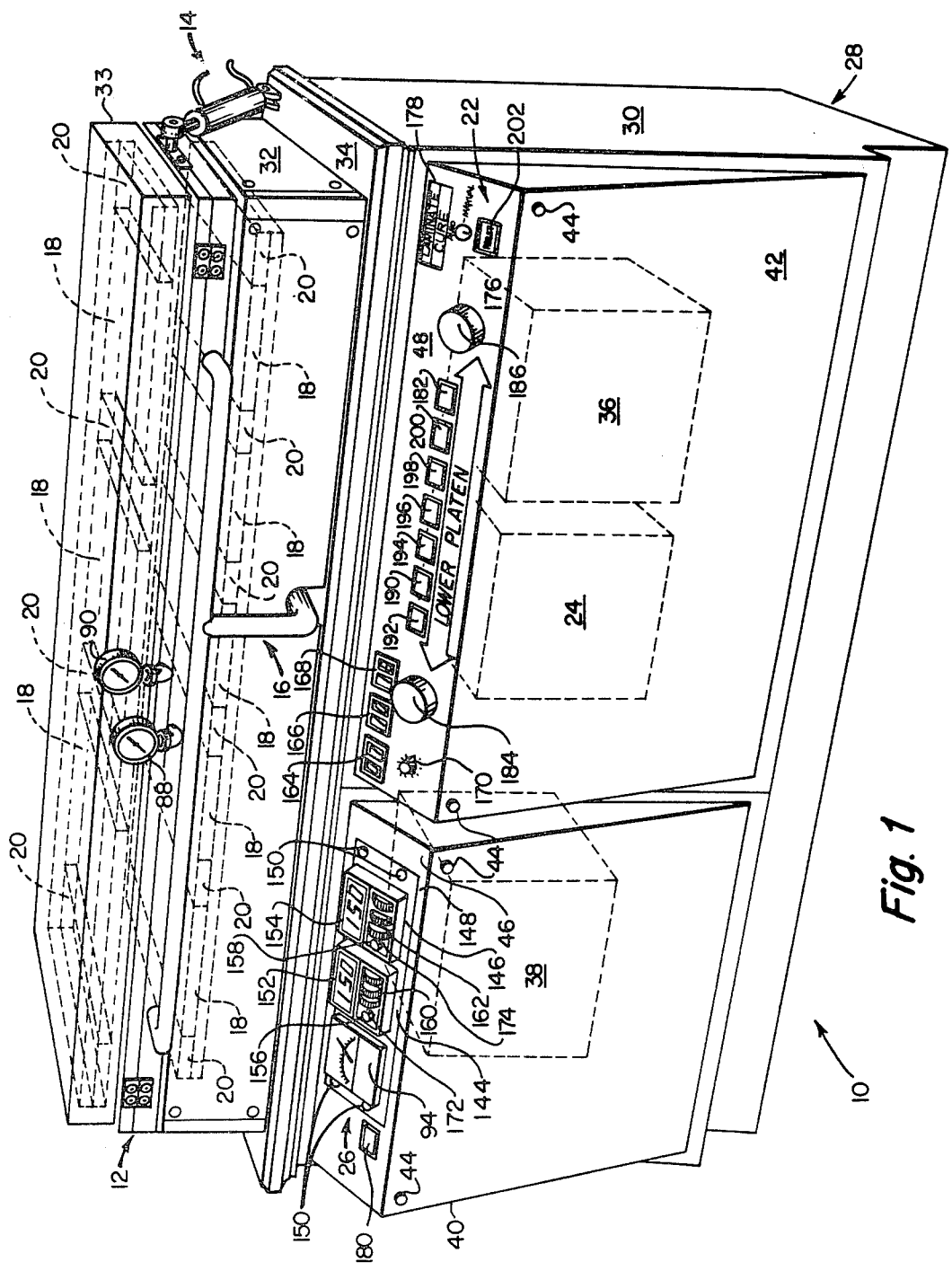
FIG. 1 is a perspective view of a laminator constructed in accordance with the present invention.

Generally, the illustrated embodiment of a laminator 10 (FIG. 1) designed for laminating and/or encapsulating a multilayer laminate assembly comprises a processing chamber 12, means 14 for opening and closing the chamber 12, means 16 for creating a vacuum in the chamber 12, a plurality of heaters 18 surrounding the chamber 12, cooling means 20 disposed between adjacent heaters 18, control means 22 mounted on the front of the laminator 10 for setting the processing parameters thereof, computer means 24 for controlling the operation of the laminator 10, and display means 26 mounted adjacent the control means 22 for displaying and monitoring the processing parameters.

The laminator 10 preferably is contained within a suitable metal cabinet 28. The cabinet 28 preferably is formed of two parts: a bottom part 30 and a top part 32 having a cover 33, separated by a bench top 34. The bottom part 30 houses, in addition to the computer means 24, a vacuum pump 36 and a power distribution box 38. The control means 22 and the display means 26 are mounted on a left apron 40 and a right apron 42. The aprons 40 and 42 removably are hung on the front side of the bottom part 30 of the laminator 10, and are each secured thereto by a pair of screws 44. The easy and quick removal of the aprons 40 and 42 permits ready access, from the front, to certain of the operative parts of the laminator 10, including but not limited to the power distribution box 38, the computer 24 and the vacuum pump 36. An easily removable cover, not shown, encloses the bottom part 30 from the rear and permits ready access thereto also from that direction. Servicing and maintenance of the laminator 10 are thereby greatly facilitated. The aprons 40 and 42 present forwardly sloping surfaces 46 and 48, respectively, further to facilitate the setting and the monitoring of the processing parameters of the laminator 10 via the control 22 and display 26 means located on these surfaces 46 and 48.

Figure 2:
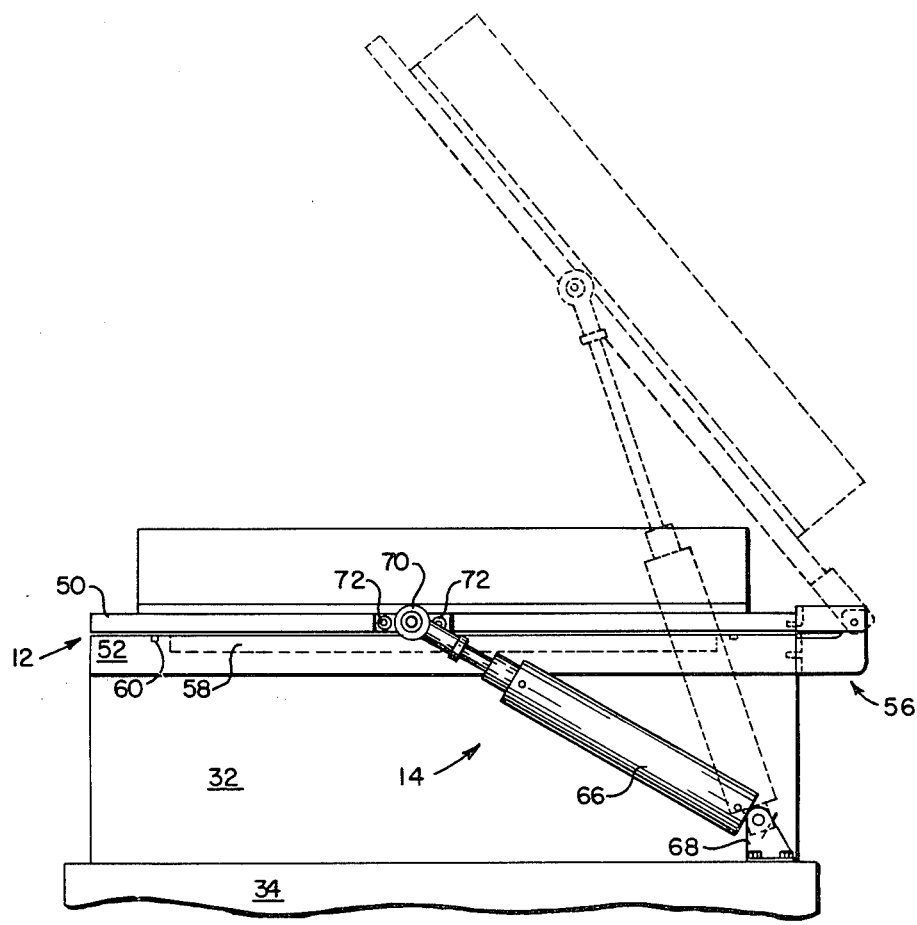
FIG. 2 is a fragmentary side elevation of the laminator of FIG. 1, from the right-hand side thereof.
Figure 3:
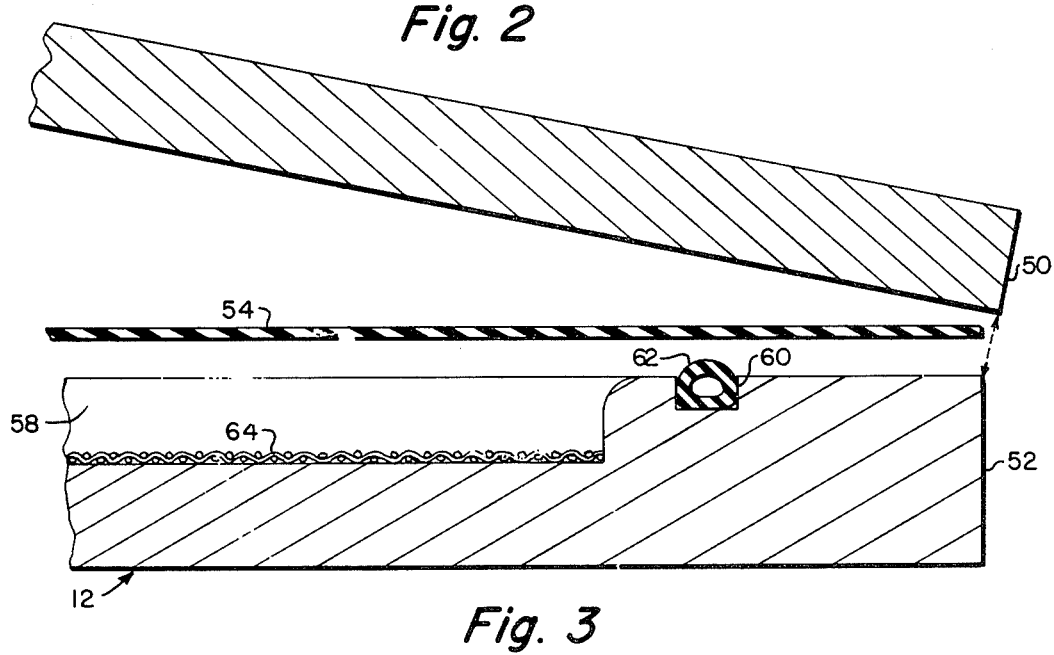
FIG. 3 is a fragmentary vertical section, on an enlarged scale, of a portion of the laminator shown in FIG. 2.

As may be best observed in FIGS. 2 and 3, the processing chamber 12 comprises an upper member 50, a lower member 52, and a rubber diaphram 54 disposed therebetween. The upper 50 and lower 52 members are hingelike secured to one another along one edge, preferably by a pair of hinges 56, with one hinge 56 mounted at one end of the edge and the other hinge 56 mounted at the other end thereof. The upper member 50 preferably is a smooth platen and the lower member 52 is provided with a cavity 58 and a peripheral groove 60 completely surrounding the cavity 58. An "O" ring 62 is accommodated within the peripheral groove 60. A woven mesh member 64, preferably made of aluminum, is disposed within the cavity 58. This woven mesh member 64 helps speed the evacuation of air from the cavity and also is helpful in eliminating hot spots.

At the conclusion of any processing cycle, the processing chamber 12 is designed to open automatically, as shown in dashed lines in FIG. 2. The automatic opening, as well as the manual closing, of the processing chamber 12 is effected by the means 14, which includes a pair of double-acting cylinders 66, respectively secured at the sides of the processing chamber 12 and operatively associated with the hingelike mounting of its upper and lower constituent members 50 and 52. Preferably, the cylinders 66 are pneumatic cylinders. One end of the cylinders 66 is secured to the bench top 34 by brackets 68, and the other end of the cylinders 66 is fastened about a pin 70, which is secured to the upper member 50, about midway thereof, by suitable fasteners 72.

Figure 4:
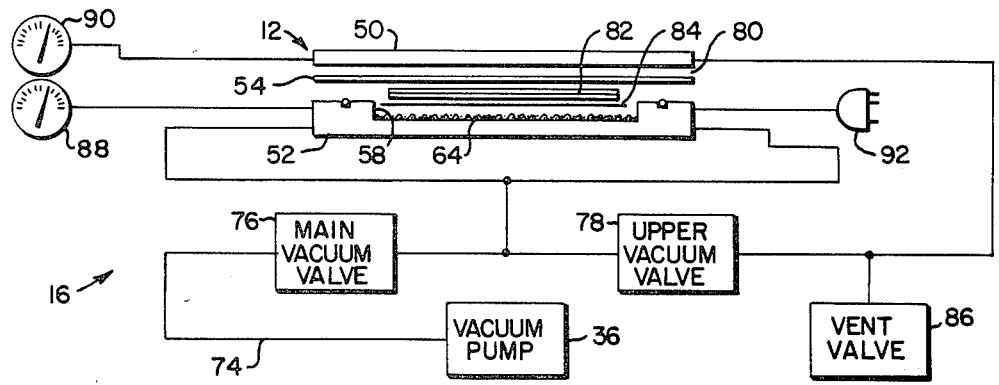
FIG. 4 is a schematic and block diagram of the laminator vacuum system.

A schematic and block diagram of the laminator vacuum system or means 16 is shown in FIG. 4. The vacuum system 16, which is a double-vacuum system, comprises, in addition to the already mentioned vacuum pump 36, a valved manifold 74 connected via a main vacuum valve 76 and an upper vacuum valve 78 to two vacuum compartments: a main vacuum compartment represented by the cavity 58 in the lower member 52 of the processing chamber 12, and an upper vacuum compartment represented by a space 80 between the upper member 50 and the diaphragm 54. The valved manifold 74 allows concurrent pumping of both the upper and the main vacuum compartments. This represents a feature which is particularly advantageous during the initial evacuation of a multilayer laminate assembly 82 when it is placed in the cavity 58 on top of the woven mesh member 64. Optionally, a paper 84 can be placed over the woven mesh member 64 before the laminate assembly 82 is placed in the cavity 58. This paper 84 will catch any thermoplastic material that may squeeze out at the edges of the multilayer assembly 82 during the lamination and/or the curing cycle, preventing thereby undesirable material buildup on the woven mesh member 64 and extending thus its useful life. The paper 84 also facilitates the proper de-airing of the laminate assembly 82 during the pump down. The dual-compartment vacuum system 16 further includes a vent valve 86, also connected to the upper compartment via the manifold 74, and a pressure readout instrumentation comprising two types of indicators: a pair of tube gauges 88 and 90 and a thermocouple gauge control 92 operatively connected to a thermocouple gauge meter 94 located on the forwardly sloping surface 46 of the left apron 40, observe FIG. 1. The tube gauges 88 and 90 are used to measure pressures from 0-30 inches Hg., and the thermocouple gauge control 92 is used to measure pressures lower than that in the range from $10^{-3}$ torr to two torr. With the upper vacuum valve 78 closed, the opening of the vent valve 86 allows air to be bled into the upper compartment, i.e., the space 80 between the upper member 50 and the diaphragm 54, giving further versatility to the operation of the processing chamber 12.

Figure 5:
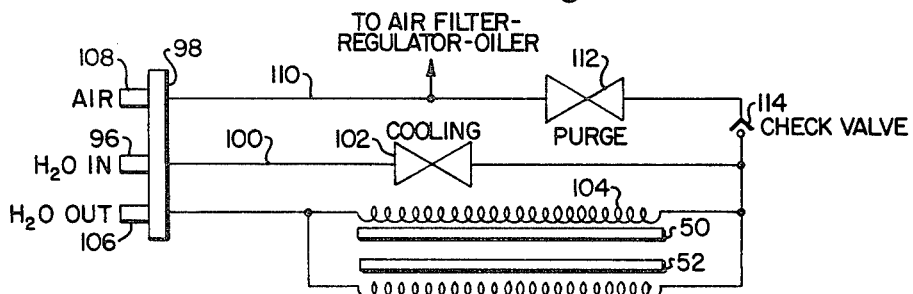
FIG. 5 is a block diagram of the laminator forced cooling system.

In FIG. 5, there is shown a block diagram of the forced cooling system for the laminator 10. This forced cooling system uses a cooling fluid medium, which preferably is water, such as regular city or town water. Water is conveniently admitted into the laminator 10 by connecting a hose or pipe, not shown, carrying the water to an inlet 96 (marked $H_2O$ IN) located on a rear plate 98 of the laminator 10. From there, the water is carried, via a pipe 100 and past a cooling valve 102, to the plurality of cooling means 20 removably disposed between adjacent heaters 18 and located both above and below the processing chamber 12, observe FIG. 1. This plurality of cooling means 20 is indicated in FIG. 5 by a pair of coils 104 shown disposed both above and below the upper and lower members 50 and 52 of the processing chamber 12. Water conveniently is removed from the laminator via another hose or pipe, not shown, which is connected to an outlet 106 (marked $H_2O$ OUT) also located on the rear plate 98, preferably adjacent the inlet 96. Although the specific configuration of each of the removably mounted plurality of cooling means 20 is not critical, preferably each consists of slotted aluminum strips, featuring a plurality of parallel grooves, with copper tubing inserted in the grooves. As will be noted in FIG. 5, air also is connected, via an inlet 108 and a tube or hose 110, to the inlet side of the cooling system. The source of air, not shown, is either a compressor or a hose or pipe connected to a compressor, and preferably is maintained under a pressure from about eighty to about one hundred p.s.i. Compressed air is admitted to the cooling system, via a purge valve 112 and a one-way check valve 114, after the completion of the cooling cycle so as to purge the entire cooling system of the cooling medium, i.e., the water therein. This purging of the cooling system prevents the cooling medium from being also heated and in fact boiled during the lamination and the curing cycles. The result is a more energy-efficient operation for the laminator 10.

Figure 6:
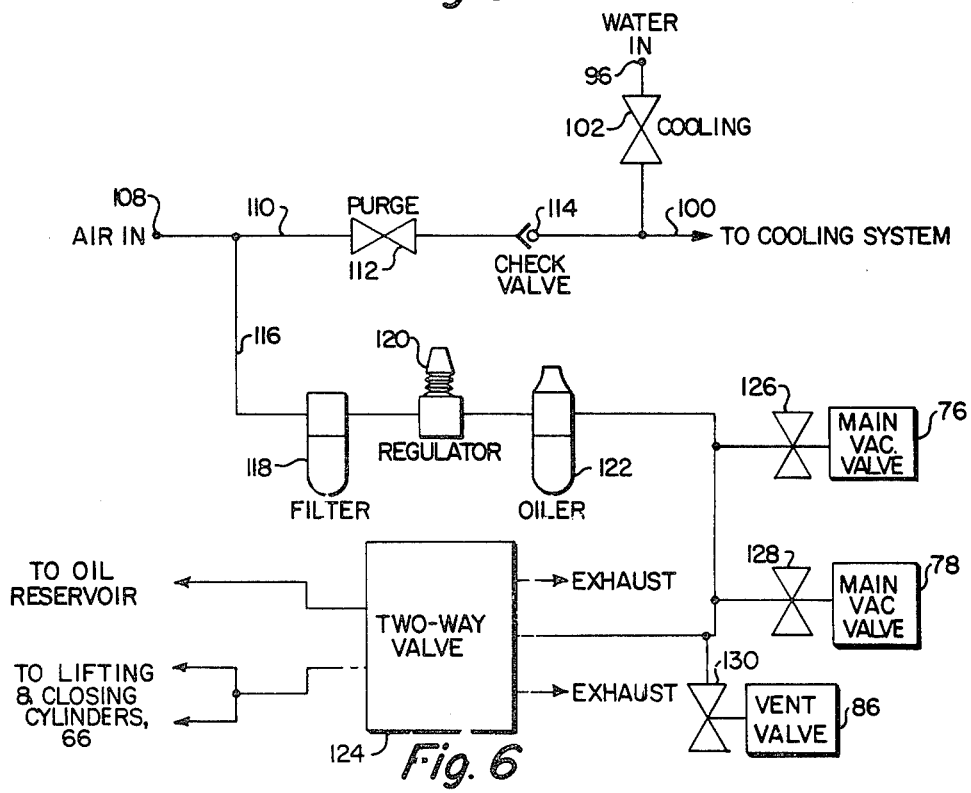
FIG. 6 is a block diagram of the laminator air system.

A schematic block diagram of the laminator air system is disclosed in FIG. 6. In addition to purging the cooling system, compressed air also passes, via a hose or pipe 116, through a filter 118, a regulator 120 and an oiler 122, to supply the force to actuate either or both of the vacuum valves, namely the main vacuum valve 76 and the upper vacuum valve 78, and the vent valve 86, and also the force, via a two-way valve 124, either to left or to close the upper, smooth platen member 50 by actuating the pair of cylinders 66, observe also FIG. 2. Appropriate solenoid valves 126, 128 and 130, respectively, interposed in the system, permit the actuation of the respective air-actuated large valves 76, 78 and/or 86.

Figure 7:
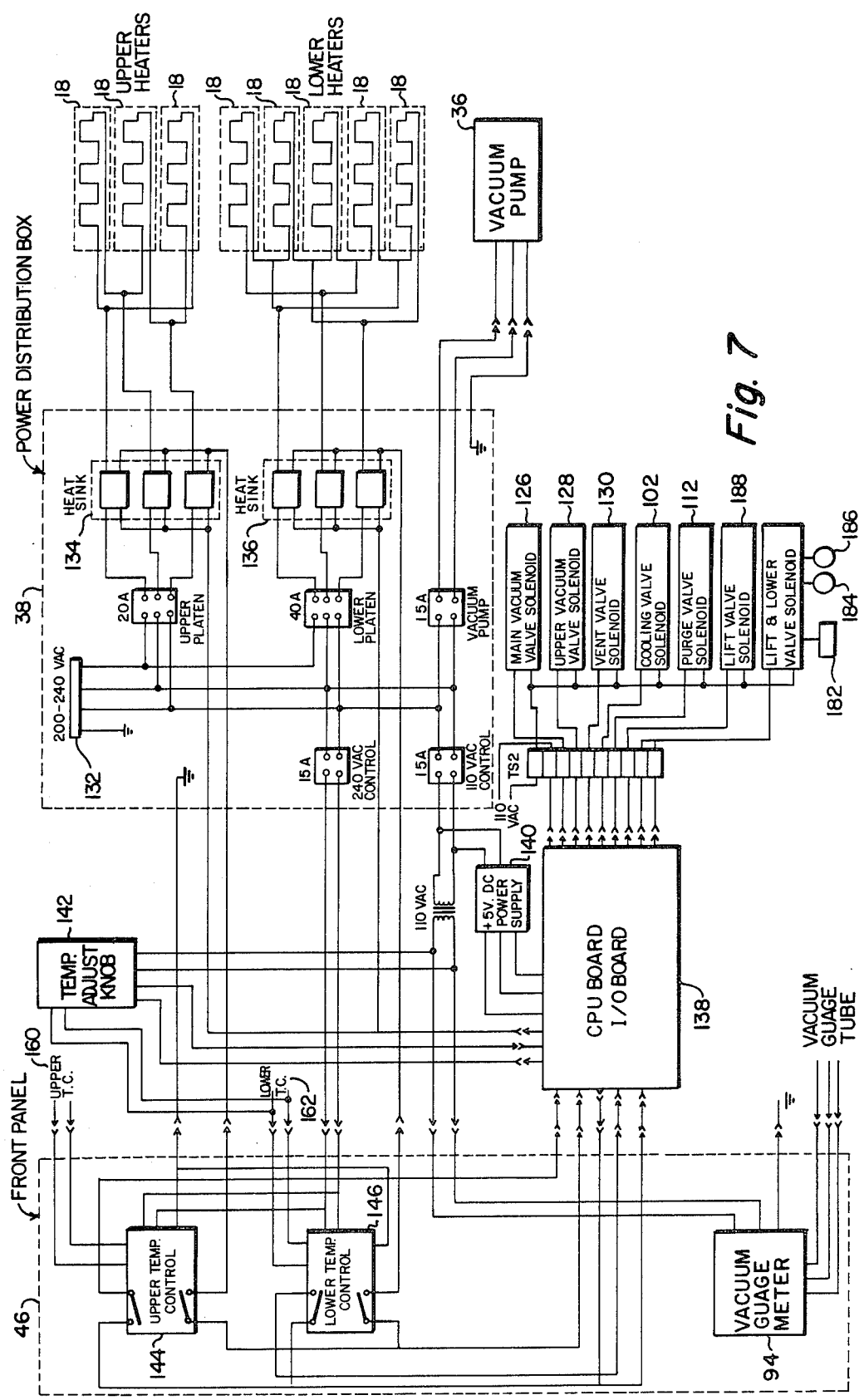
FIG. 7 is an electrical schematic of the laminator of FIG. 1.

A preferred electrical schematic for the laminator 10 is shown in FIG. 7. Preferably, the electrical power requirement for the laminator 10 is for a three-phase, 200 to about 240 VAC, 60 Amps., 50/60 Hz power source, not shown, which is connected to the laminator 10 via an appropriate electrical inlet 132, located in the power distribution box 38 and accessible from the rear of the laminator 10. In order to protect the solid state relays, a pair of heat sinks 134 and 136 also are contained within the power distribution box 38. The computer means 24 preferably is a microprocessor 138, including a CPU board and an I/O board, powered by a +5VDC power supply 140, incorporating a rectifier and a step-down transformer. Also accessible from the rear of the laminator 10 is a temperature adjustment knob 142. This knob 142 allows the selection and setting of the desired temperature for the end of the cooling cycle from zero to 300° C. The preferred temperature setting at the knob 142 is from about 40° C. to about 50° C. The lamination and/or curing temperatures for the plurality of heaters 18 are selectable at the front panel 46 of the laminator 10. There are two temperature controllers: one temperature controller 144 associated with the heaters located above the upper member 50 of the processing chamber 12 and another temperature controller 146 associated with the heaters located below the lower member 52 of the processing chamber 12. These upper 144 and lower 146 heater temperature controllers are mounted to the forwardly sloping surface 46 of the left apron 40 by means of a plate 148, on which also is located the thermocouple gauge meter 94. The plate 148 is removably secured to the surface 46 by a number of screws 150. Each of the temperature controllers 144 and 146 preferably features a three-digit LED display 152 and 154, a three-position toggle switch 156 and 158 and a number of rotatable knobs 160 and 162. With the toggle switches 156 and 158 in a central, neutral position, the LED displays 152 and 154 indicate the actual, measured temperatures in C.° of their respective consisted heaters. Each temperature controller 144 and 146 has two temperature set-points available, the significance of which will become evident from the description of the operation of the laminator 10. With the toggle switches 146 and 158 pushed upward from the neutral into a first position, the desired cure temperature is introduced and set in the controllers 144 and 146, respectively, by rotating the respective knobs 160 and 162. The electrical equivalents of these knobs 160 and 162 are indicated in FIG. 7 by the leads marked "Upper T.C." and "Loser T.C." respectively. It is understood that upon rotation of the knobs 160 and 162, the three-digit LED displays 152 and 154 will show the respective selected temperature for set-point I. This is the temperature to which the respective heaters will be brought and kept at during operation of the laminator 10. When the toggle switches 156 and 158 are pushed downward, passed the central, neutral position, into a second position, the desired respective signaling temperature for set-point II is selected by the turning of the knobs 160 and 162 and will appear in the respective three-digit LED display 152 and 154.

On the adjacent forwardly sloping surface 48 of the right apron 42, observe FIG. 1, three sets of two-digit displays 164, 166 and 168 are shown. Each of these two-digit displays 164, 166 and 168 features a pair of digits, each of which is manually displaceable between 0 and 9. By manually dialing in the desired digits, the respective operational times are selectable for the laminator 10. The display 164 allows the selection of the "pump time" in minutes, the display 166 of the "press time" in units of 10 seconds each, and the display 168 of the "cure time" in minutes. As an optional feature, the laminator 10 also is provided with a heater duty cycle switch 170. This heater duty cycle switch 170 provides additional and more refined control over the heating system of the laminator 10, when it is run in an automatic mode. This switch 170, not otherwise shown in FIG. 7, is connected in series with the temperature controllers 144 and 146. For the shortest processing time, the switch is turned to the position marked FULL (100% on). The other switch positions preferably are multiples of one-eighth time each, i.e., 12.5%. The zero position shuts the heaters 18 off. Also preferably, each of the heater temperature controllers 144 and 146 is provided with a proportional band adjusting screw 172 and 174, respectively, by means of which the propositioning band, i.e., the rate of heating of the respective heaters 18 is selected. The heater temperature controllers 144 and 146 function either as proportional or on/off controllers, depending on the selected position of these proportional band adjusting screws 172 and 174.

The laminator 10 works as follows. By inserting a key in the key switch 176, the operator first selects the underlying mode of operation: vertical, as shown, for the automatic mode and horizontal for the manual mode. With the key switch 176 in the automatic mode, the operator next selects betwen two automatic cycles: a laminate only cycle and a combined laminate and cure cycle. This latter selection is effected with the position of a transparent plastic button 178, bearing the legend LAMINATE above a central horizontal line and the legend CURE below that line. A source of illumination, not shown, lights up either only the top half of the button 178 when the button 178 is in its raised position, indicating the laminate cycle only, or it lights up the entire button 178 when the button 178 is in its push-in position, indicating a combined laminate and cure cycle of operation.

With the key switch 176 in the MANUAL mode of operation, the operator first depresses a LIFT PLATEN button 182, located on the forwardly sloping surface 48. With the cavity 58 now exposed, the operator preferably places the paper 84 over the aluminum woven mesh screen 64 before positioning the multilayer laminate assembly 82 thereon, observe FIG. 4. Next, the operator places the rubber diaphragm 54 over the lower member 52 and effects the closing of the processing chamber 12 by simultaneously depressing both LOWER PLATEN push buttons 184 and 186. Except for having to depress the LIFE PLATEN button 182, the above steps are identical with those in the two automatic cycles, too. In the automatic cycles, the microprocessor 138 is programmed to actuate a lift valve solenoid 188 (observe FIG. 7) so as to automatically open the processing chamber 12 at the end of the cycle.

At this point, all other push buttons on the sloping surface 48 of the right apron 42 should be in the off (meaning protruding out) position. Next, the operator checks or selects the desired set-point I on both heater temperature controllers 144 and 146. This preferably is about 150° C., which is the temperature to which both the upper 50 and lower 52 members of the processing chamber 12 will be heated. Then the chamber 12 is placed under vacuum by first depressing the UPPER VACUUM button 190 to open the valve 78 to the upper compartment 80, followed by depressing the MAIN VACUUM button 192 to open the main vacuum valve 76 to commence evacuating both the upper 80 and the lower 58 compartments. The depression of a button 194 marked HEATING will turn on the heaters 18.

When the processing chamber 12 reaches the desired temperature, as indicated by the three-digit LED displays 152 and 154, the UPPER VACUUM button 190 is again pressed to close the valve 78 to the upper compartment 80. This is followed by pressing a VENT button 196 to open the vent valve 86 and thereby to allow air to enter the upper compartment 80. The above steps in the process are intended to apply pressure to the rubber diaphragm 54. If it is desired to have full atmospheric pressure on the diaphragm 54, then the VENT button 196 is left in the open, i.e., pushed in position. If it is desired to have but partial atmospheric pressure on the diaphragm, then by observing the tube gauge 90 for the rising pressure, the vent valve 86 will be closed by again pressing the VENT button 196 so as to assume its off, i.e., protruding position when the desired pressure is reached.

Depending on whether the above described manual mode cycle is intended to laminate only or to both laminate and cure the multilayer laminate assembly 82, the respective required time must be noted and applied from the point when the lower member 52 has reached the desired cure temperature. On the average, with a cure temperature of about 150° C., laminate is effected in about eight minutes. For both lamination and cure at the same 150° C. temperature, a combined time of about thirty-five minutes usually is required. Some variations in the above mentioned times can occur, depending on the size, the number and the composition of the layers and the shape of the laminate assembly 82. It is to be noted that the laminator 10 can be used to laminate either a glass superstrate assembly, a double-glass assembly or a glass substrate assembly. The lamination of the several layers of the multilayer laminate assembly 82 is achieved by interposed solid sheets of thermoplastic, such as ethylene vinyl acetate (EVA) or polyvinyl butyral (PVB).

When the noted time for either the lamination or the lamination-cure cycle has expired, the operator again depresses the HEATING button 194 to turn off the plurality of heaters 18, followed by pressing a COOLING push button 198 to open the valve 102 to allow water to enter through the pipe 100 and to flow through the entire interposed cooling system 20, as represented by the coils 104, observe FIG. 5. When the desired temperatures for the processing chamber 12 appear on the three-digit LED displays 152 and 154, the flow of water again is shut off by again pressing the COOLING button 198, closing thereby the valve 102. Next, the water preferably is removed from the cooling system by pressing a PURGE push button 200, which opens the valve 112 to allow compressed air to enter into the cooling system via the one-way check valve 114. This check valve 114, of course, serves to prevent the water from entering the pipe 110 of the air system. Purging requires about fifteen to about twenty seconds, after the expiration of which the PURGE button 200 again is pressed to close the valve 112.

Before opening the processing chamber 12, the pressure across the diaphragm 54 must be equalized. This is achieved by first pressing the MAIN VACUUM button 192 to blank off the vacuum pump 36 by closing the main vacuum valve 76, and followed by pressing the UPPER VACUUM button 190. If the vent valve 86 was closed, it must be opened to the atmosphere by pressing the VENT button 196 in. (The pushed-in position, with the respective transparent button also being lit, represents the "on" position. Conversely, the protruding, unlit state for the respective button represents the "off" position.) With both upper 80 and lower 58 compartments of the processing chamber 12 once again being at atmospheric pressure, represented by zero readings on both dial vacuum tube gauges 88 and 90, the chamber 12 is opened by pressing the LIFT PLATEN button 182.

In the two automatic cycles, a pre-programmed, optimized process sequence is set up in the microprocessor 138 to provide high quality laminated or laminated and cured assemblies with consistent repeatability. The processing parameters need be entered only at the start of the production run and will remain the same unless changes therein are necessary. These processing parameters include the selection and setting of the set-points I and II for both temperature controllers 144 and 146. Preferably, these are about 150° C. for the set-points I in both controllers 144 and 146, and about 78° for the set-point II in the upper temperature controller 144 and about 148° C. for the set-point II in the lower temperature controller 146. Next, the end of the cooling cycle temperature set point is set at the back of the laminator 10 by adjusting the temperature adjusting knob 142 to the desired value, about forty to fifty degrees C. Then, the rate of heating is set either by adjusting the proportional band adjusting screws 172 and 174 and/or by adjusting the optional heater duty cycle switch 170. The processing parameters also include the setting of the respective vacuum pump time (preferably about seven minutes) on the two-digit display 164, the respective press time during which the diaphragm 54 is under pressure (which may vary from zero to about thirty-nine, all in units of ten seconds each) on the two-digit display 166, and to respective laminate only time (about eight minutes) or the laminate and cure time (about thirty-five minutes) on the two-digit display 168. If the key switch 176 is in the horizontal, manual mode, a RESET push button 202 is to be pressed before the key switch 176 is turned into the vertical, automatic mode. The RESET button 202 can be used to abort the laminator 10 at any point in the processing sequence. When the RESET button 202 is pressed, all valves will close, all heaters will be shut off, with the microprocessor 138 cleared, ready for the next lamination or lamination and cure cycle. With the switch key 176 in the horizontal, manual mode, the pressing of the RESET button 202 has no effect on the valves or heaters but will clear the microprocessor 138.

Following the loading of the processing chamber 12 as above described, the START button 180 is pressed to start the respective automatic cycle as selected by the button 178. First, the microprocessor 138 checks to see if the chamber 12 is properly closed with the aid of a microprocessor, not shown, which preferably is located at the base of the left double-acting cylinder 66. If the chamber 12 is not properly closed, the laminator 10 will not commence its cycle of operation. Otherwise, the main vacuum valve 76 and the upper vacuum valve 78 open and the heaters 18 are turned on. Both compartments 80 and 58 of the processing chamber 12 are thus both evacuating and heating, as the operator can readily observe by watching the gauges 88 and 90 and the LED displays 152 and 154. If no vacuum is indicated on the gauges 88 and/or 90 after about ten seconds, he is to press the RESET button 202 to stop the laminator 10. Then by turning the key switch 176 to manual and pressing the LIFT PLATEN button 182, to operator can check the "O" ring 62 for proper position within the groove 60. If all is well, the operator re-selects the automatic mode and restarts as above explained.

When the processing chamber 12 reaches the temperature selected as the set-point I (about 78° C.) on the upper temperature controller 144, a signal is thereby passed to the microprocessor 138 to pressurize the diaphragm 54 by closing the upper vacuum valve 78 and opening the vent valve 86 to the atmosphere. This puts the upper compartment 80 at atmosphere, with the lower compartment 58 still being evacuated.

When the processing chamber 12 heats to the temperature selected by the set-point II (about 148° C.) on the lower temperature controller 146, a signal is thereby sent to the microprocessor 138 to begin the laminate only or the laminate and cure time, depending on the position of the switch 178 and the time dialed in at the two-digit display 168. When the respective selected time has expired, the microprocessor 138 turns off the heaters 18 and initiates the cooling cycle by opening the cooling valve 102. When reaching the temperature (about 40° C. or 50° C.) selected on the temperature adjustment knob 142, the microprocessor 138: shuts off the cooling valve 102, opens the purge valve 112, closes the main vacuum valve 76 and opens the upper vacuum valve 78. This removes the cooling medium from the cooling system and vents both compartments of the processing chamber 12 to the atmosphere via the already open vent valve 86. About fifteen seconds later, the microprocessor 138: closes the purge valve 112, closes both the upper vacuum valve 78 and the vent valve 86, and actuates the lift valve solenoid 188 (FIG. 7) so as to automatically open the processing chamber 12. The diaphragm 54 is then removed and the now laminated multilayer assembly unloaded from the cavity 58.

Thus it has been shown and described a laminator 10 designed for laminating and/or encapsulating multilayer laminate assembles, which laminator 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A laminator featuring a double-vacuum system and comprising:
   (a) a chamber;
   (b) means for opening and closing said chamber;
   (c) means operatively associated with said chamber for creating a vacuum therein;
   (d) a plurality of heaters surrounding said chamber;
   (e) cooling means mounted in between said plurality of heaters;
   (f) control means disposed on the front of said laminator for setting the processing parameters of said laminator, wherein said cooling means comprises a plurality of metal strips removably clamped between said plurality of heaters.

2. The laminator of claim 1 further including a pneumatic system designed: to purge said cooling means, to actuate said vacuum means and said means for opening said chamber.

3. The laminator of claim 1 further including a woven mesh member disposed within said cavity, a laminate assembly intended for lamination and/or encapsulation by said laminator placed on said woven mesh member in said cavity, and a vent connected to said space, allowing air to be admitted into said space.

4. The laminator of claim 2 wherein said members are hingelike secured to one another, and wherein said pneumatic system includes a pair of double-acting cylinders respectively secured at the sides of said hingelike mounting of said upper and lower members and designed to pivot said upper member about said hingelike mounting, and wherein said pneumatic system is maintained under a pressure of about 80 to about 100 p.s.i.

5. The laminator of claim 1 wherein each of said plurality of heaters surrounding said chamber is removably mounted via a plurality of flexible clamps, with each of said plurality of heaters being formed of a resistance wire encased in a metal sheath and rated for 240 VAC and about two kilowatts power and each of said metal strips provided with grooves, said grooves designed to accommodate tubing carrying a cooling medium.

6. The laminator of claim 1 wherein said control means for setting the processing parameters of the laminator include a pair of temperature controllers, one of which is associated with said plurality of heaters surrounding said chamber at one side and the other of which is associated with said plurality of heaters surrounding said chamber at the opposite side, and a number of processing time selectors, one each for selecting a pumping time, a press time and a cure time, respectively.

7. The laminator of claim 6 wherein each of said pair of temperature controllers is provided with two set-points and wherein said control means further includes a duty cycle selector switch connected in series with said temperature controllers.

8. The laminator of claim 1 wherein said computer means is a microprocessor designed to provide two automatic cycles of operation for said laminator: a shorter cycle intended for effecting lamination only and a longer cycle intended for effecting both lamination and cure.

9. The laminator of claim 6 wherein said control means further includes a switch for selecting a manual mode of operation for said laminator.

10. The laminator of claim 1 wherein said display means includes vacuum measurement gauges and temperature measurement meters, said vacuum measurement gauges comprising a pair of tube gauges and a thermocouple gauge, and said temperature measurement meters comprise light emitting diodes.

* * * * *